Dec. 9, 1941.  B. F. J. SCHONLAND  2,265,868
PROTECTION OF APPARATUS FROM LIGHTNING DISTURBANCES
Filed May 23, 1938  2 Sheets-Sheet 1
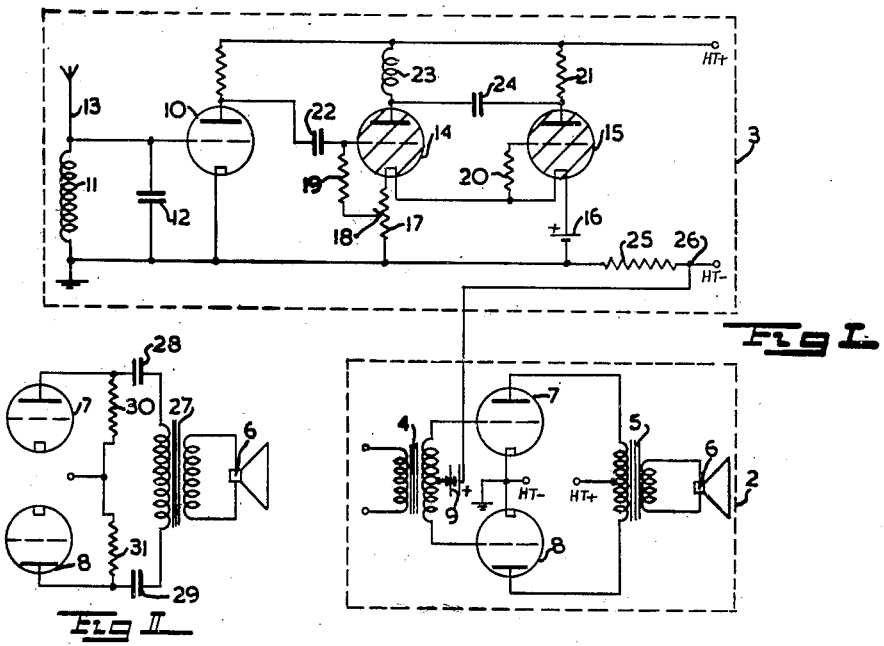
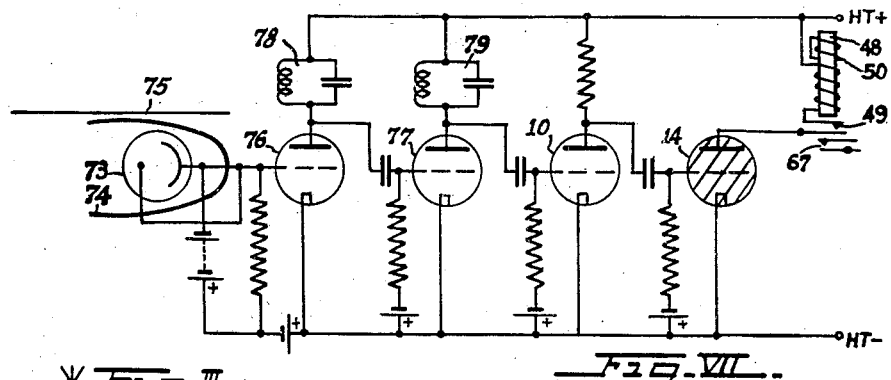
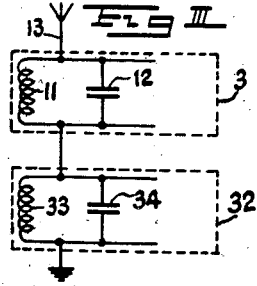
B. F. J. Schonland
Inventor
By: Glascock Downing & Seebold
Attys.

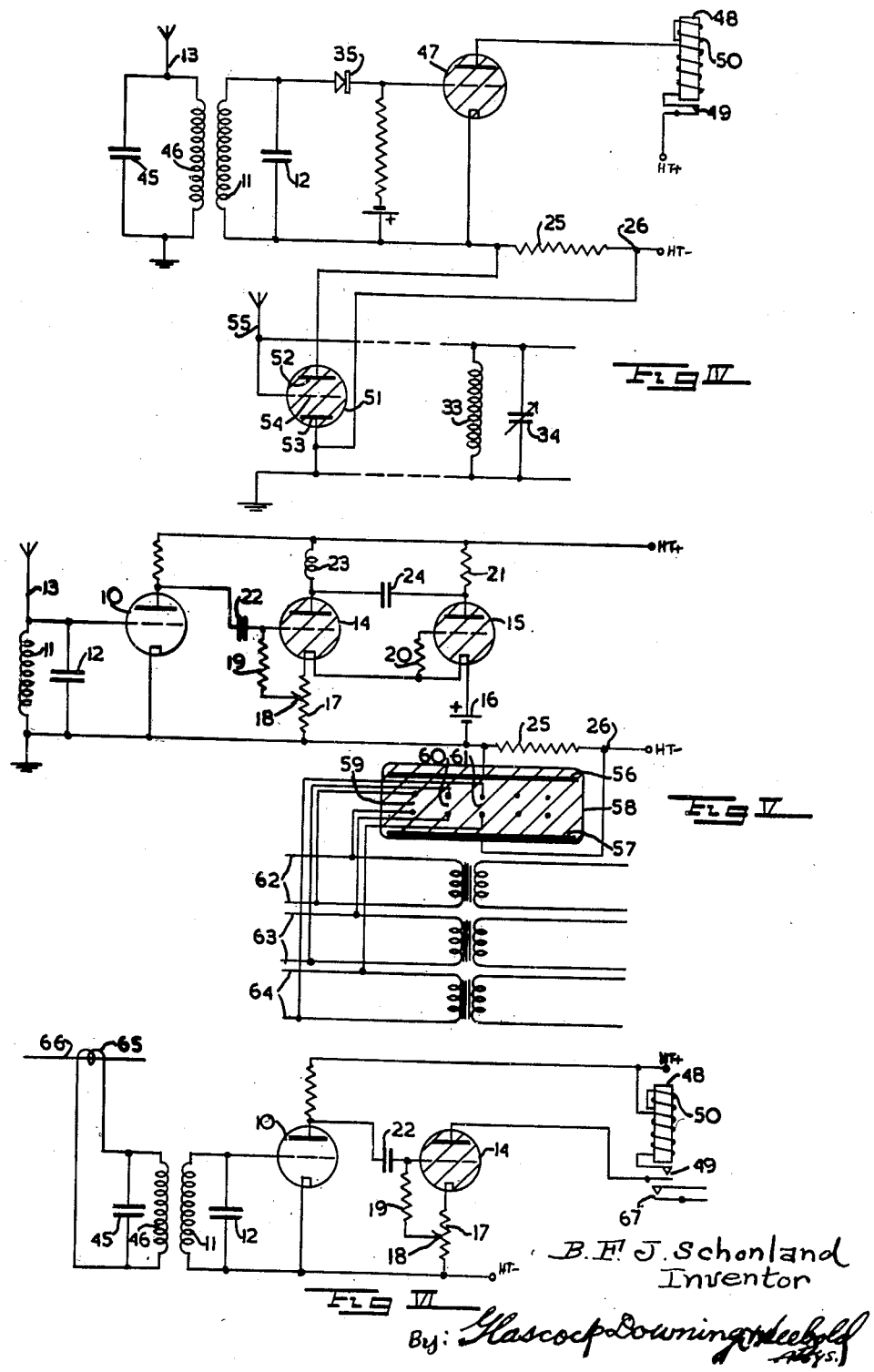

Patented Dec. 9, 1941

2,265,868

UNITED STATES PATENT OFFICE 2,265,868

PROTECTION OF APPARATUS FROM LIGHTNING DISTURBANCES

Basil Ferdinand Jamieson Schonland, Johannesburg, Union of South Africa, assignor to The University of the Witwatersrand Johannesburg, Johannesburg, Union of South Africa Application May 23, 1938, Serial No. 209,602
In the Union of South Africa April 12, 1938

6 Claims. (Cl. 250—20)

The present invention relates to the protection of electrical apparatus from disturbances resulting from lightning discharges.

Lightning discharges can cause destructive or obnoxious disturbances in electrical apparatus by producing travelling surges along power and telephone lines and by producing Herzian waves in radio receivers (which is often referred to as "static"). In the former case the disturbance is destructive and in the latter it is obnoxious.

Numerous devices are known wherein the object is the protection of apparatus from such disturbances and all of these known devices divert the waves or surges that cause the disturbances at the moment when the waves or surges arrive at some point of the plant or apparatus.

An object of the present invention is to effect such diversion before such arrival of the surges or waves.

I have discovered that the lightning discharge which causes the above-described destructive or obnoxious disturbances and which will be referred to in the following as the "main discharge" is preceded by a preliminary discharge which causes innocuous phenomena of the following kind:

(a) A train of luminous impulses emitted from the path subsequently traversed by the main discharge and having a frequency lying between about 10 and 30 kilocycles per second and enduring for a time of the order of one hundredth of a second.

(b) A train of Herzian waves of the same frequency and duration as, and concurrent with, the luminous impulses.

(c) In the case of power and signal transmitting lines struck by, or in the neighborhood of the discharge, a train of waves travelling along the lines with a frequency of approximately 10 to 30 kilocycles per second and enduring for approximately one hundredth of a second.

The subsequent main discharge produces in the case of (b) a complex Herzian wave of an amplitude greatly exceeding that of the preliminary train of Herzian waves and covering a much greater frequency band, and in the case of (c) a destructive surge or wave of an amplitude greatly exceeding that of the preliminary train of travelling waves.

The innocuous preliminary phenomena are utilized, in carrying out the invention, to accomplish anticipatory switching for the purpose of diverting the waves or surges which are caused by the subsequent main discharge and which cause the destructive or obnoxious disturbances.

Accordingly, the method of protecting apparatus from destructive or obnoxious disturbances caused by lightning includes the step of utilizing the characteristic frequency of the innocuous phenomena of the preliminary discharge, which precede the main discharge, to initiate protective electric switching operations by which the apparatus is rendered immune for a time interval of sufficient length to substantially cover the duration of the main discharge, from the waves or surges which are caused by the main discharge and cause the destructive or obnoxious disturbances.

A device for carrying out this method comprises an electrical circuit tuned to a frequency band of about 10 to 30 kilocycles, and arranged to be excited by the innocuous impulses; together with switching means for rendering the apparatus immune from the waves or surges produced by the main discharge and arranged to be tripped by excitation of the tuned circuit, for a time interval of sufficient length to cover the duration of the main discharge.

The apparatus is suitable for protecting any kind of apparatus such as wireless receivers, telephone and power lines and apparatus, and the like.

Embodiments of the invention will now be described by way of example, reference being made to the accompanying drawings comprising Figures I to VII.

Figure I shows the output stage of a radio receiver and a protective circuit for protecting said output stage from atmospherics.

Figure II shows a modified form of output stage for the radio receiver of Figure I.

Figure III shows an arrangement for operating a radio receiver and protective circuit from the same aerial.

Figure IV shows a further form of protective circuit for radio receivers.

Figure V shows protective arrangements for long distance telephone lines.

Figures VI and VII show protective arrangements for power transmission lines.

In Figure I of the drawings, 2 indicates the output stage of radio receiving apparatus, and 3 indicates means according to the invention for eliminating from the output stage 2 the disturbing effect of atmospherics due to lightning flashes. The output stage of the receiving apparatus 2 is shown as comprising an input transformer 4, an output transformer 5 feeding a loudspeaker 6, and a pair of output valves 7, 8 arranged in push-pull and supplied with negative grid bias via the secondary winding of transformer 4 from a bias battery 9.

The protective means 3 includes a detector valve 10 with its grid connected to a tuned circuit comprising an inductance coil 11 and a condenser 12 which are connected in parallel and tuned to the frequency of the preliminary Herzian waves or a frequency of from 10 to 30 kilocycles per second approximately. The preliminary Herzian waves are picked up by an aerial 13 and energise the grid of valve 10 which operates on the bottom bend of its anode current/grid volts characteristic so that the received waves cause momentary increases in the anode current of valve 10. These intermittent increases in anode current are employed to produce a switching operation which persists for a predetermined time interval. This time interval is made greater than the maximum duration of the preliminary phenomena but need only exceed such maximum duration by the very small time interval occupied by the waves or surges produced by the main discharge. The desired switching operation may be effected by valves, such as triode, tetrode or pentode valves, whether high vacuum valves or gas-filled valves. In the circuit shown it is effected by two gas-filled grid-controlled valves 14 and 15, commonly known as thyratrons. Thyratrons 14 and 15 have their filaments heated from a battery 16 via a resistance 17 which is provided with a variable tapping 18, a connection from this tapping being taken through a resistance 19 to the grid of the thyratron 14. The position of the tapping 18 is so adjusted as to apply a negative bias to the grid of the thyratron 14 of sufficient value to prevent its igniting under normal circumstances. The grid of thyratron 15 on the other hand is connected to its filament through a resistance 20 so that under normal conditions it is in the ignited condition and carries current which is limited to a low value by an anode resistance 21. When the grid of the valve 10 is energized by the preliminary Herzian waves, its anode current pulsates and a train of positive impulses is thereby applied to the grid of thyratron 14 via a condenser 22. Thyratron 14 thereupon ignites and a large current flows in its anode circuit. A drop of potential is thereby produced across the choke 23 in its anode circuit, and a negative impulse of sufficient amplitude to extinguish the thyratron 15 is thereby applied to the anode of the thyratron 15 through the condenser 24. After an interval determined by the constants of the circuit, the thyratron 15 will again re-ignite and the flow of current in its anode circuit will cause a negative impulse to be applied to the anode of the thyratron 14 through the condenser 24. Thyratron 14 is thereby extinguished and remains in this condition until the next train of preliminary Herzian waves is received.

The result of this cycle of operations is that the thyratron 14 commences to pass current just before the waves produced by the main discharge arrive and continues to pass current for a fixed interval which is so chosen that it expires just after the termination of the waves produced by the main discharge. During this interval, an increased current flows through a resistance 25 in the anode circuit of the thyratron 15 with the result that its unearthed terminal 26 has a greater negative potential during this interval than at any other time. The duration of the time interval may be increased to include the duration of disturbances following the first.

Terminal 26 is connected to the positive pole of the bias battery 9 of the output stage 2 with the result that the momentary increase in negative potential at the terminal 26 causes a momentary increase in the negative bias applied to the grids of the output valves 7 and 8 and reduces their anode currents for an interval which embraces the duration of the atmospheric produced by the lightning stroke. If the valves 7 and 8 are accurately balanced, no direct flux will be present in the core of transformer 5, so that the intermittent increases in the bias of valves 7 and 8 produced by trains of preliminary Herzian waves will not produce clicks in the loudspeaker 6. The result is that the sound output from the loudspeaker 6 has gaps which would otherwise be filled with static noise which latter would have a much more disturbing effect on the listener than the gaps in the sound output. The value of the increase in potential across the resistance 25 may be so chosen that instead of entirely disabling the reproducing circuit including the loudspeaker 6, it only partially disables said circuit so that reproduction of speech or music plus static continues but at a weaker strength.

Figure II shows a modified output circuit which may be used in place of the output circuit of Figure I with equally satisfactory results as regards the prevention of clicks when the bias from the terminal 26 is momentarily increased. The output transformer 27 has an untapped primary winding which is connected to the valves 7 and 8 via condensers 28 and 29 respectively, anode potential being fed to the valves 7 and 8 via resistances 30 and 31 respectively.

Figure III shows an arrangement in which the protective circuit 3 and the radio receiver 32 having the output stage 2 are energised from the same aerial 13 by connecting the tuned circuits 11, 12 and 33, 34 of the protective circuit 3 and radio receiver 32 respectively in series between the aerial 13 and earth. When the receiver 32 has a frame aerial, and possibly in other cases, it may be more convenient to energise the protective circuit 3 from a separate aerial.

Figure IV shows another form of protective circuit for a radio receiver. Preliminary Herzian waves received by the aerial 13 excite a tuned circuit 45, 46 which in turn excites a coupled tuned circuit 11, 12; both circuits being tuned to the frequency of the preliminary waves or a frequency of from 10 to 30 kilocycles per second approximately. The oscillations in the circuit 11, 12 are rectified by the dry contact rectifier 35 and applied to the grid of a thyratron 47 which thereupon strikes. The current in the anode circuit of the thyratron 47 passes through an electromagnetic contact-making relay 48 which thereupon operates and opens the anode circuit of the thyratron 47 at contacts 49, whereupon the thyratron 47 becomes extinguished. After a time lag determined by a short-circuited winding 50, the relay 48 releases and re-closes the original circuit of the thyratron 47. The potential drop across the resistance 25 is thereby momentarily increased as in the case of Figure I. This increase in potential is arranged to be sufficiently great to cause the striking of a cold cathode gas-filled tube 51 having two electrodes 52 and 53 connected to opposite ends of the resistance 25, the electrode 53 being also connected to earth. Tube 31 is provided with a third electrode 54 which is positioned between the electrodes 52, 53 and is connected to the aerial 55 of the radio receiver. When the tube 51 strikes, a low resistance gas discharge path is provided between the aerial 55 and earth so that the disturbance is prevented from exciting the input circuit 33, 34 of the radio receiver. The tube 51 is preferably arranged away from the radio receiver close to the aerial and earth as it then protects the receiver from high potentials which may be set up in the aerial due to induction or severe discharges, because electrodes 52 and 53 provide a spark gap which permits high potentials on the aerial to spark to earth; the tube 51 will have this protective effect even when the protective circuit including the thyratron 47 is not switched on, and also when the radio receiver is not switched on.

Figure V shows an arrangement applying the invention to the protection of the terminal apparatus at telephone repeater stations or other places along long distance telephone lines to shunt the telephone lines each time preliminary travelling waves are received. Resistance 25 forms part of a protective circuit similar to that of Figure I and energised from an aerial 13 which is made directional so that it only responds to waves originating from lightning flashes which occur along the length of the line, because lightning flashes taking place away from the length of the line would not produce any substantial disturbing effects at the terminal apparatus. The terminals of the resistance 25 are connected to two electrodes 56 and 57 of a cold cathode gas discharge tube 58 which ignites each time preliminary waves are received, in the same way as the tube 51 of Figure IV. Between the electrodes 56 and 57 there is provided a plurality of pairs of electrodes 59, 60, 61 etc. which are connected to corresponding wires at the incoming ends of trunk lines 62, 63, 64 etc. The low resistance discharge path thus set up across each trunk line, each time preliminary waves are received prevents the terminal apparatus from being damaged by surges set up in the line by lightning flashes.

Figures VI and VII show applications of the invention to minimise the effect of lightning flashes in the vicinity of electric power lines, more particularly to the protection of the terminal apparatus. In response to preliminary waves collected by an aerial or received along the power line itself, a protective circuit is set in operation to isolate the line from the terminal apparatus.

In the arrangement of Figure VI, the detector valve 10 is coupled, via tuned circuits 11, 12 and 45, 46 and a transformer 65, to a power line 66. When the preliminary surge is received along the power line 66, the thyratron 14 ignites in the manner described with reference to Figure I. Relay 48 is thereby operated, opens the anode circuit of the thyratron 14 and the contacts 49 (as in the case of Figure VI) and closes a circuit for line isolating equipment at contacts 67.

Figure VII shows the use of directionally sensitive protective apparatus for use in conjunction with long conductors such as telephone lines, power lines, or pipe lines. A photo-sensitive device 73, such as a photo-electric tube, is arranged inside a paraboloidal reflector 74 directed along the length of the electrically conducting line 75. When a preliminary discharge occurs along the length of the line 75, it emits light rays to form a series of luminous impulses having a frequency of from 10 to 30 kilocycles per second approximately. These light rays are concentrated onto the photo-electric tube 73 by the reflector 74 and the resultant electrical oscillations produced by the tube 73 are amplified by a tuned amplifier comprising valves 76 and 77 with their anode circuits 78 and 79, respectively, tuned to a frequency of from 10 to 30 kilocycles per second approximately. The oscillations are rectified by the detector valve 10 and cause the ignition of a thyratron 14 as in the case of Figure VI. The current which flows in the anode circuit of the thyratron 14 causes the operation of the relay 48 which opens the circuit of the thyratron 14 at contacts 49 and closes a circuit for protective equipment at contacts 67.

I claim:

1. A device for protecting electrical apparatus the normal operative frequency of which is outside the frequency band of 10 to 30 kilocycles from destructive or obnoxious disturbances caused by lightning comprising, an oscillatory circuit tuned to a frequency of from 10 to 30 kilocycles per second approximately, a rectifier coupled to said circuit, an output circuit for said rectifier, a grid-controlled gas discharge tube coupled to said output circuit, an anode circuit for said tube, and a contact-making relay connected to said anode circuit.

2. In a device associated with multi-circuit radio receiving apparatus for protecting a reproducing circuit of the radio receiving apparatus from the disturbances caused by main discharges of lightning, an oscillatory circuit tuned to a frequency of about 10 to 30 kilocycles per second, a switching circuit coupled to said oscillatory circuit and comprising means for producing a blocking voltage lasting for a predetermined period of time each time when the potential across said oscillatory circuit reaches a predetermined value, and means for applying said blocking voltage to one of said circuits of the radio receiver and disabling said reproducing circuit for said predetermined period of time.

3. A method of protecting electrical apparatus the normal operative frequency of which is outside the frequency band of 10 to 30 kilocycles from destructive or obnoxious disturbances caused by the main discharge of lightning which comprises the steps of, selectively picking up electromagnetic waves produced by the preliminary discharge preceding the main discharge and having a characteristic frequency of about 10 to 30 kilocycles, amplifying said waves and thus producing a control voltage, and using said control voltage to initiate a switching operation rendering said apparatus immune from destructive or obnoxious disturbances for a time interval of sufficient length to cover said main discharge.

4. A method of protecting electrical apparatus the normal operative frequency of which is outside the frequency band of 10 to 30 kilocycles from destructive or obnoxious disturbances caused by the main discharge of lightning which comprises the steps of, selectively picking-up waves produced by the preliminary discharge preceding the main discharge and having a characteristic frequency of about 10 to 30 kilocycles, producing from said waves a control voltage, and using said control voltage to initiate a switching operation rendering said apparatus immune from destructive or obnoxious disturbances for a time interval of sufficient length to cover said main discharge.

5. A device for protecting electrical apparatus the normal operative frequency of which is outside the frequency band of 10 to 30 kilocycles from destructive or obnoxious disturbances caused by main lightning discharges comprising, an electrical circuit tuned to be excited materially only by frequencies of about 10 to 30 kilocycles per second, means connected to said circuit for picking up the innocuous phenomena preceding the main lightning discharge, second means coupled to said tuned circuit, said second means being arranged to produce upon excitation by said tuned circuit a protective voltage and including means for maintaining said protective voltage for a predetermined period of time, and means for applying said protecting voltage to a suitable circuit of the electrical apparatus which is to be protected.

6. A device for protecting electrical apparatus the normal operative frequency of which is outside the frequency band of 10 to 30 kilocycles from destructive or obnoxious disturbances caused by main lightning discharges comprising, means including a circuit tuned to a frequency of 10 to 30 kilocycles per second, means for picking-up and amplifying the innocuous phenomena preceding the main discharge and producing from the impulses of the aforesaid frequency a control voltage, switching means arranged to be tripped by said control voltage, said switching means including means for producing when so tripped a protective voltage for a predetermined period of time, and means for applying said protective voltage to a circuit of the apparatus which is to be protected.

BASIL FERDINAND JAMIESON SCHONLAND.